United States Patent [19]
Dhanji

[11] Patent Number: 5,665,487
[45] Date of Patent: Sep. 9, 1997

[54] WATER-ACIVATED STORAGE BATTERY

[75] Inventor: Shiraz Dhanji, Deerfield Beach, Fla.

[73] Assignee: Sartech Systems, Inc., Deerfield Beach, Fla.

[21] Appl. No.: 550,982

[22] Filed: Oct. 31, 1995

[51] Int. Cl.$^6$ ............................................. H01M 6/34
[52] U.S. Cl. ............................................. 429/119; 429/146
[58] Field of Search ............................. 429/119, 146, 429/208, 246

[56] References Cited

U.S. PATENT DOCUMENTS

| | | |
|---|---|---|
| 3,205,096 | 9/1965 | Honor . |
| 3,288,649 | 11/1966 | McCallum . |
| 3,450,570 | 6/1969 | Root . |
| 3,716,403 | 2/1973 | Braun . |
| 3,943,004 | 3/1976 | Hooner et al. . |
| 3,953,238 | 4/1976 | Honer . |
| 3,966,497 | 6/1976 | Honer . |
| 4,007,316 | 2/1977 | Koontz . |
| 4,288,507 | 9/1981 | Carr et al. ............... 429/209 |
| 4,555,457 | 11/1985 | Dhanji . |
| 4,735,630 | 4/1988 | Planchat ............... 429/70 |
| 5,424,147 | 6/1995 | Khasin et al. ............... 429/119 |

OTHER PUBLICATIONS

Journal of the Electrochemical Society Publ. Aug. 1975, "Cathodes for Seawater Activated Cells".

Primary Examiner—M. Nuzzolillo
Attorney, Agent, or Firm—Herbert L. Lerner; Laurence A. Greenberg

[57] ABSTRACT

The cathode of the water-activated battery is a chloride member with a silver coating on its surface or it is a silver-chloride cathode. The anode is a magnesium plate. The anode and cathode are spaced apart with a rigid spacer member. A battery casing encloses the electrodes. A conductive liquid such as saltwater enters the housing through entry and exit ports formed therein and the water then surrounds the electrodes. Lead wires, e.g. a wire bundle, project through the casing wall and they connect to a light or a similar load. The battery is operated by immersing the housing into the conductive liquid, removing the entry port plug from the entry port to permit the conductive liquid to enter the casing through the entry port, and removing the exit port plug from the exit port to permit the conductive liquid to exit the casing through the exit port.

22 Claims, 4 Drawing Sheets

WATER-ACIVATED STORAGE BATTERY

BACKGROUND OF THE INVENTION

1. Field of the Invention

The present invention pertains to water-activated batteries, i.e. deferred-action batteries which are activated when water or a similar liquid conductor comes into contact with the anode and the cathode inside the battery casing.

More specifically, the present invention relates to a water-activated immersion type battery for use on life vests, life rafts and in survival kits, which is capable of powering a signal light and able to withstand long storage at high and low temperatures and high humidity.

2. Description of the Related Art

The first water-activated batteries were developed in the 1940's by Bell Laboratories, and were further improved by General Electric Company. The early water-activated batteries were already characterized by a relatively high energy density. They were used primarily for military applications, such as in torpedoes and weather balloons, and for air-sea rescue equipment, pyrotechnic equipment, marine markers and emergency devices.

A seawater battery of the above-noted type is described, for example, in U.S. Pat. No. 3,966,497 to Harold Honer. The cells are disposed in a housing which is provided with two openings through which the electrolyte (seawater) flows into and out of the casing. The cells each comprise a sandwich formed of the anode, a sheet of flexible plastic material, and a cathode. As illustrated in the patent specification, the battery power lasts approximately three hours, with a reduction in the power output to below 80% after about 160 minutes.

Water-activated batteries, like many other types of batteries, create electric current by a chemical reaction between the anode and the cathode. When water enters the cell, it acts as a conductor permitting an ionic exchange between the anode and cathode to create an electric current. The anode, which may be made of magnesium, is progressively consumed during the reaction. The magnesium is transformed into magnesium hydroxide and magnesium chloride. The chloride is supplied by sodium chloride present in sea water and the hydrogen atoms are supplied by the water itself.

There are several types of water-activated batteries, including so-called immersion systems, and forced flow systems. Immersion type batteries are activated by immersion of the cell into a conducting liquid, solvent or electrolyte. Forced flow batteries are used as a power source for specialized applications, such as electric torpedoes. Sea water is forced through the battery as the torpedo travels through the water. Dunk type batteries are designed with absorbent separators between the electrolytes and are activated by pouring a conductive solution into the battery, where it is absorbed by the separators. The water-activated battery is constructed dry, stored in a dry condition and activated at the time of use by the addition of water or a conductive aqueous solvent.

Cathode materials have variously included silver chloride, copper thiocyanate-sulfur and magnesium dioxide. The most common cathode materials have been silver chloride and copper chloride. Also used are lead chloride, copper iodide-sulfur, copper thiocyanate-sulfur and manganese dioxide with a magnesium per-chlorate electrolyte.

Copper chloride became commercially available in 1949 and has lower energy densities, lower rate capability and less resistance to storage at high humidity, unlike silver chloride and copper chloride batteries. The latter are used primarily for airborne meteorological equipment, because silver chloride is more expensive and not warranted for most other applications.

The most widely accepted anode (negative plate) material is magnesium. Magnesium is the lightest structural metal in the industry. Magnesium is chemically active and thus is well suited for use in a water-activated battery. The anode is usually made from a type of magnesium alloy called AZ61 which is 6 percent aluminum, 1 percent zinc and 93 percent magnesium. AZ61 is preferably used because it deteriorates and polarizes less than other magnesium alloys. Other anode materials are used to produce various voltages. Zinc is selected for long life, but produces low power and low current in water-activated batteries. Zinc also produces minimal sludge. Aluminum is not a suitable anode because of its rapid formation of a protective, insulting oxide film ($Al_2O_3$) on its surface.

Cathodes (positive plate) of conventional batteries are formed with a depolarizer and a current collector. The depolarizer takes the form of a powder which is electrically non-conductive. For the depolarizer to work, a form of carbon is added to impart conductivity. A chemical binder is also added to cause molecular attraction, and a metal grid is provided to collect the current. Silver chloride is a nonconductive cathode and is made conductive by reducing the surface to silver.

An example of a prior magnesium manganese-dioxide cell is illustrated in a paper entitled "Safe Annual Symposium Magnesium, The Safe Power Solution, Shiraz Dhanji, ACR Electronics, Inc." That type of battery, however, is not specifically designed for oceanic safety applications.

SUMMARY OF THE INVENTION

It is accordingly an object of the invention to provide a water-activated battery, which overcomes the above-mentioned disadvantages of the heretofore-known devices and methods of this general type and which provides a superior (fresh or salt) water-activated battery, which activates quickly upon immersion in water and which produces a high current output. It is still another object of the invention to provide such a battery which may be stored for long periods prior to activation and which is durable and reliable. It is further quite important to provide a battery which is economical to manufacture.

With the foregoing and other objects in view there is provided, in accordance with the invention, a water-activated battery, comprising:

a battery casing defining a chamber, the battery casing having a liquid entry port formed therein for allowing conductive liquid into the chamber;

a cathode member disposed in the chamber;

an anode member disposed in the chamber; and spacer members attached to the housing and rigidly spacing the cathode member from the anode member.

An alternative embodiment is defined as a water-activated battery, comprising: a cathode member, an anode member, conductive liquid in contact with the cathode member and the anode member, a battery casing enclosing the cathode member and the anode member and retaining the conductive liquid, spacer members spacing the cathode member from the anode member, the spacer members comprising a spacer clip including a block of clip material having a block face and having a plurality of clip legs extending substantially perpendicularly from the block face, the cathode member being retained between the clip legs, and the anode member being positioned adjacent to and spaced apart from the cathode member and abutting at least one of the clip legs.

In accordance with an added feature of the invention, at least two of the plurality of clip legs tilt toward each other to firmly grip the cathode member.

In accordance with an additional feature of the invention, the block of clip material comprises four block corners and one of the clip leg extends from each of the block corners.

In accordance with a further feature of the invention, the battery casing has a liquid entry port and a liquid exit port formed therein, wherein the entry port is preferably larger than the exit port. Prior to use, the ports are sealed with port plugs, and during initial storage the batteries may be shrink-wrapped to prevent oxidation.

In accordance with a further feature of the invention, the spacer clip includes a block of clip material having a block face and having a plurality of clip legs extending substantially perpendicularly from the block face, wherein the anode member is retained between the clip legs, and wherein the cathode member is positioned adjacent to the anode member and abutting at least one of the clip legs.

The method of operating the water-activated battery includes the steps of immersing the battery in a conductive liquid, removing the entry port plug from the entry port to permit conductive liquid to enter the casing through the entry port, removing the exit port plug from the exit port to permit the conductive liquid to exit the casing through the exit port.

In other words, the cathode is plate having two opposing plate ends and retained between resilient spacer clips at both plate ends. The anode plate parallel with each face of the cathode plate and spaced apart from the cathode plate by the spacer clips. The cathode and anode plates are retained within a close-fitting battery casing, the casing including a lid portion and water entry and exit ports. The water entry port is larger than the water exit port and is located at the lower end of the casing, and the water exit port is located at the upper end of the casing. Plugs are removably fitted into the water entry and exit ports. Lead wires are connected to the cathode and anode plates and extend as a single bundle through a wire port in the casing lid portion to a light source or other device.

The anodes are preferably formed of magnesium. The cathode is preferably formed of chloride and coated with silver to initiate the chemical reaction. Once the silver surface is consumed, the chloride reacts and produces chloride ions to yield the desired voltage. The casing is preferably made of polypropylene, because this material withstands impact and does not harden or crystalize.

In its primary intended usage, the battery and the user both become immersed in water. A method of battery use includes removal by the user of the water entry and exit port plugs so that the water surrounding the casing is free to flow inside the casing, whereupon the water activates the battery, functioning as a conductor receiving and suspending cations and anions from the cathode and anode plates at a pre-set potential difference.

A water-activated battery is provided, including a cathode including a silver chloride member having a surface, a silver layer on the surface of the silver chloride member, an anode including a magnesium member, a structure for spacing the silver chloride member from the magnesium member, conductive liquid in contact with the chloride member and the magnesium member, and a battery casing for enclosing the cathode and the anode and for retaining the conductive liquid. The battery preferably additionally includes a cathode lead wire extending from the cathode and an anode lead wire extending from the anode.

Other features which are considered as characteristic for the invention are set forth in the appended claims.

Although the invention is illustrated and described herein as embodied in a water-activated storage battery, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
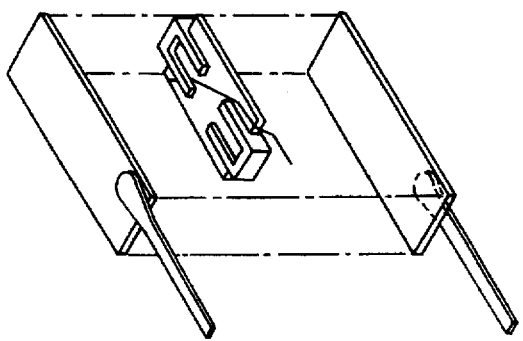
FIG. 1 is a perspective exploded view of the novel battery connected to a light source.
Figure 1:
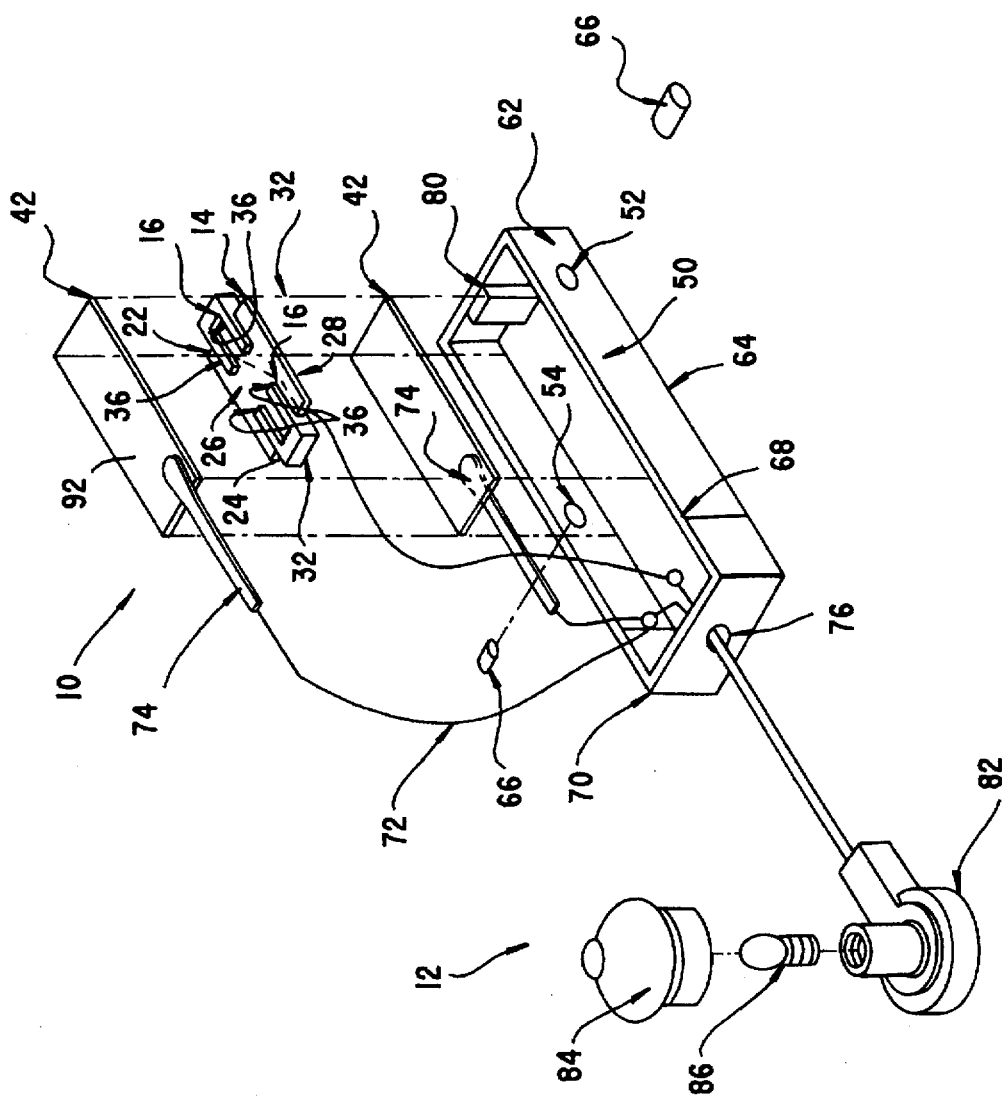

Referring now to the figures of the drawing in detail and first, particularly, to FIG. 1 thereof, there is seen a water-activated battery 10. The preferred embodiment of battery 10 is intended primarily for use on life vests and life rafts and in survival kits, although other uses are contemplated. The battery 10 is capable of powering a signal light 12 and it withstands long duration storage at high temperatures and at high humidities.

The battery 10 includes a cathode in the form of a cathode plate 14 preferably having an elongate rectangular shape and a first plate end 22 and a second plate end 24. The cathode plate 14 also has a first plate face 26 (the top face in FIG. 1) and a second plate face 28, and is retained between resilient spacer clips 16 at the plate ends 22 and 24, respectively.

Figure 2:
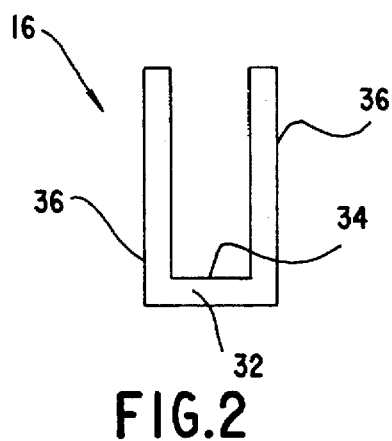
FIG. 2 is front view of one of the inventive spacer clips.
Figure 3:
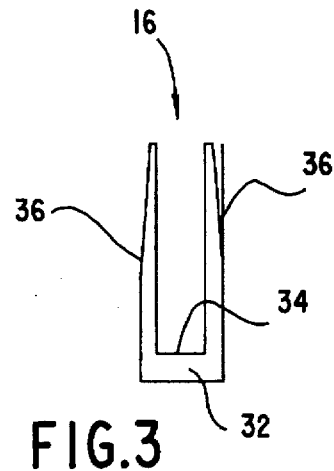
FIG. 3 is side view of one of the spacer clips.
Figure 4:
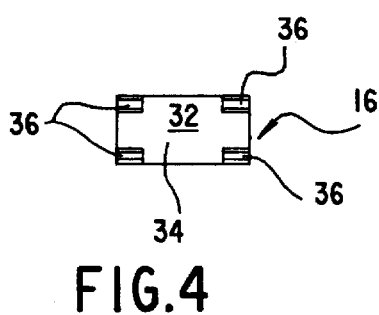
FIG. 4 is top view of one of the spacer clips.

With particular reference to FIGS. 2–4, the spacer clips 16 preferably include a block 32 of clip material having four block corners and a block face 34. A clip leg 36 extends substantially perpendicularly from a first block face 34 at each block corner, so that there are two pairs of clip legs 36. The cathode plate 14 is retained between the clip legs 36 of each pair. The clip legs 36 of each pair preferably tilt slightly toward each other to firmly and resiliently grip the cathode plate 14.

Anode plates 42 are placed adjacent to and parallel with each face 26 and 28 of the cathode plate 14. Each anode plate 42 rests against and is spaced apart from the cathode plate 14 by the clip legs 36.

Figure 5:
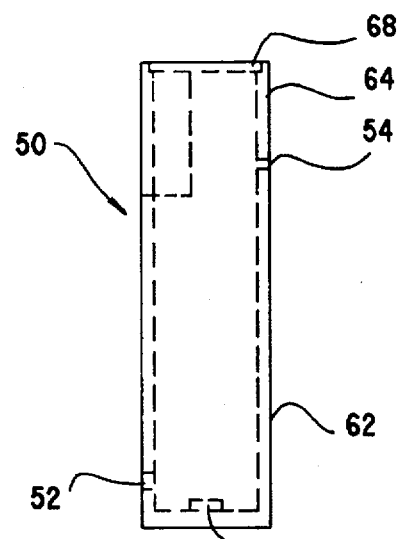
FIG. 5 is front view of the inventive battery casing.
Figure 6:
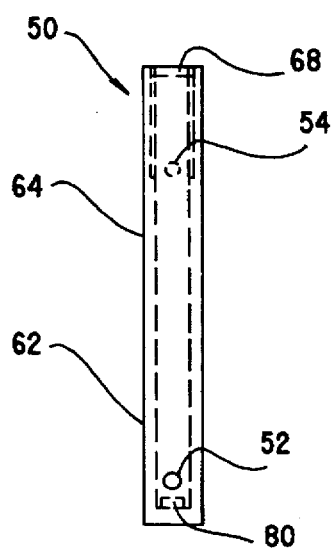
FIG. 6 is side view of the inventive battery casing.
Figure 7:
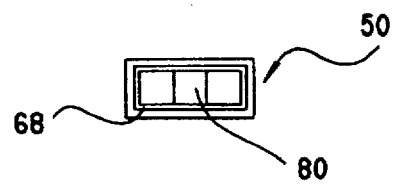
FIG. 7 is top view of the inventive battery casing.
Figure 9:
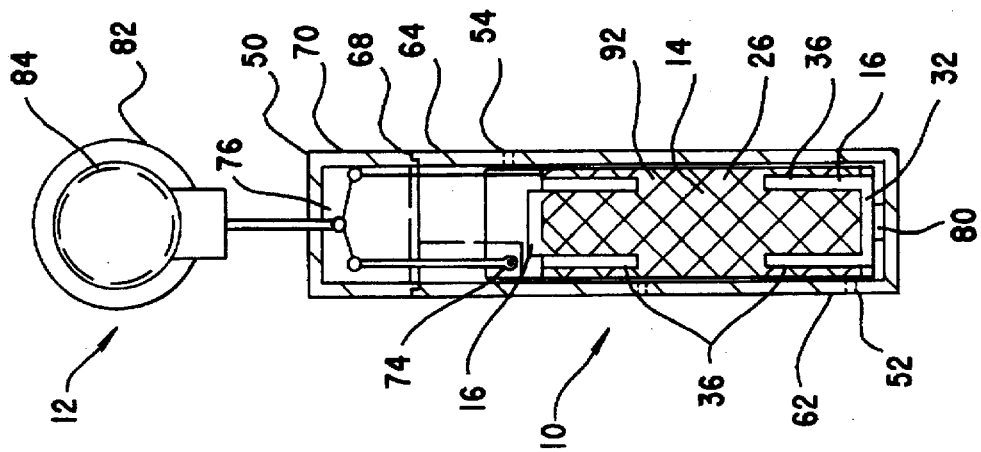
FIG. 9 is a cross-sectional front view of the battery connected to a light source.
Figure 10:
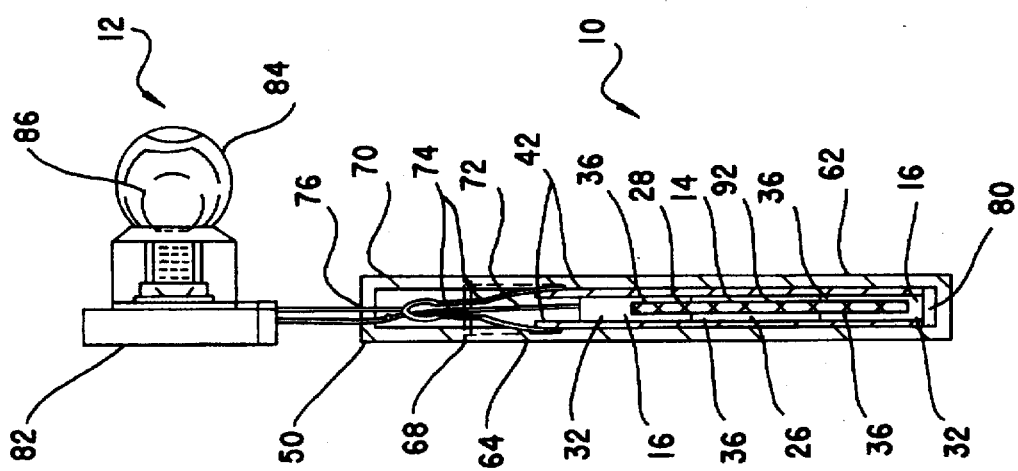
FIG. 10 is a cross-sectional view of the battery connected to a light source.
Figure 8:
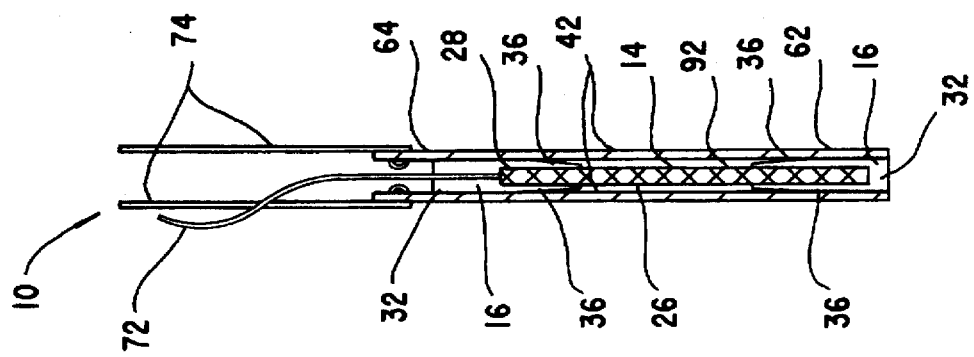
FIG. 8 is a cross-sectional side view of the battery without the casing lid.

The cathode plate 14 and the anode plates 42 are all retained within a close-fitting battery casing 50. The casing 50 is formed with a water entry port 52 and a water exit port 54, as particularly illustrated in FIGS. 5–7. The water entry port 52 is preferably located at the lower end 62 of the casing 50 and is preferably larger than the water exit port 54 so that water is better retained within casing 50. The water exit port 54 is preferably located at the upper end 64 of the casing 50, and additionally serves to permit gases and some reaction debris to escape from casing 50 before it can form battery reaction sludge.

A port plug 66 is removably fitted in the entry port 52 and in the exit port 54, to keep the battery 10 in a sealed environment during storage and to prevent premature deterioration. The casing 50 has a lid portion 70 at the upper end 64 which is removably retained on the casing 50 by snug-fitting, overlapping flanges 68. A boss 80 is provided at the bottom of the casing 50 to elevate the plates 14 and 42 so that they are not shorted by accumulated reaction sludge.

Eyelet lead wires 72 and 74 are connected to the cathode and anode plates 14 and 42, respectively, and extend as a single bundle through a wire port 76 in the lid portion 70 to the light source 12 or other emergency device. The light source 12, as shown in FIG. 1, includes a bulb holder 82, a lens dome 84 and a bulb 86.

In the preferred embodiment, the anode plates 42 are formed of magnesium. The cathode plate 14 is preferably formed of silver chloride. A bare chloride plate will not react under normal conditions of battery use. A reaction can be initiated, however, if the chloride cathode plate 14 is coated, or otherwise layered with silver, such as by attaching silver foil to a face 26 or 28, or through electro-plating. The silver coating may thereby be merely a few atomic layers or a foil of several microns. The silver layer 92 is therefore provided on the cathode plate 14 to initiate the chemical reaction. Once the silver layer 92 is consumed, which prototype testing has shown to take about three minutes, the chloride of the plate 14 reacts and produces chloride ions to yield the desired battery 10 voltage. For silver chloride cathodes, the lead wire 72 is soldered directly to the silver foil which has been heat sealed to one side of the silver chloride cathode. The connection to the anode is made by soldering the lead wire 74 to the silver foil which is welded directly onto the anode.

The casing 50 is preferably made of polypropylene, polyethylene, polyvinyl, or the like. The proper material is chosen to withstand impact and not to harden or crystallize. The port plugs 16 and the spacer clips 66 are also preferably made of polypropylene.

Figure 11:
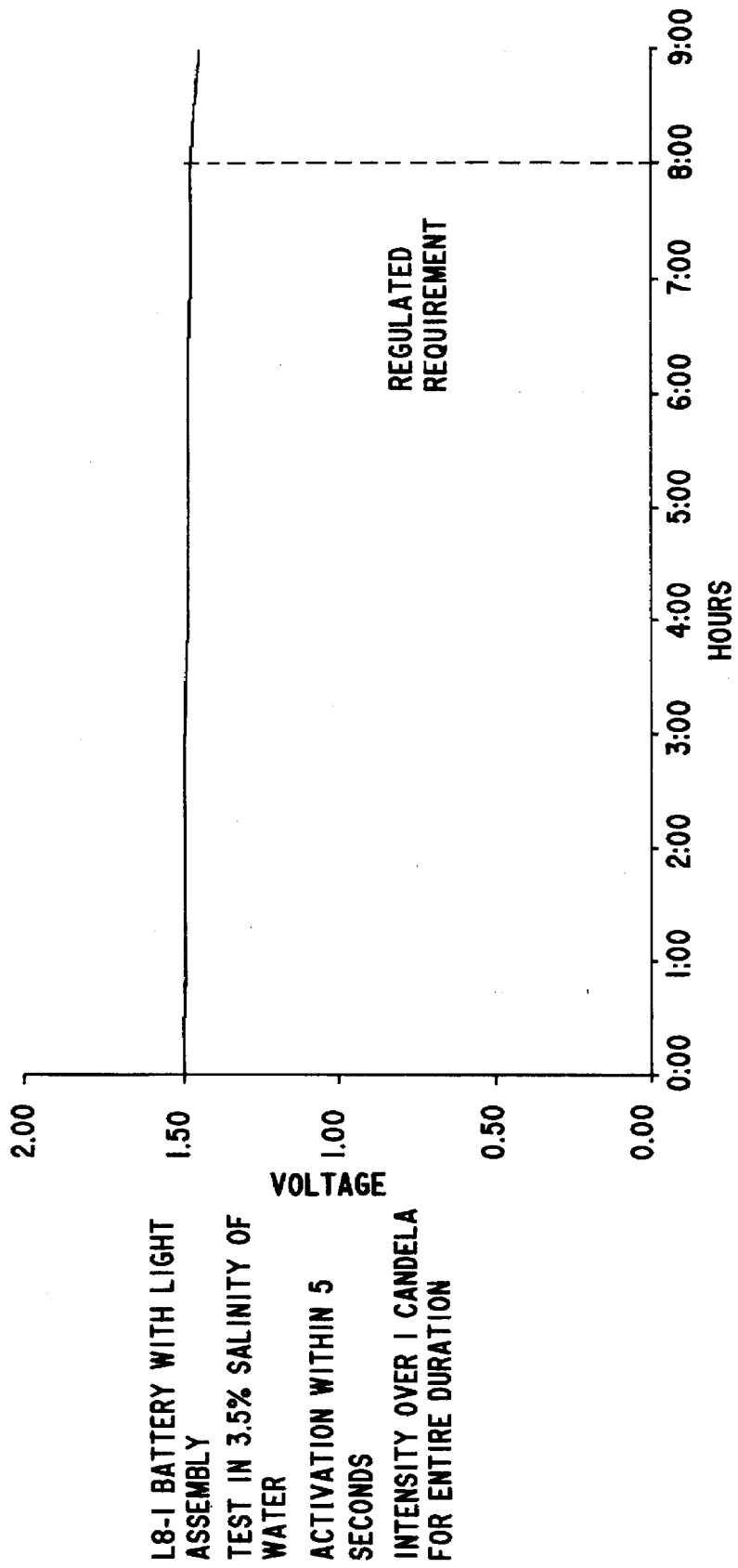
FIG. 11 is a diagram of emf output over time.

Referring now to the diagram of FIG. 11, experimental results obtained with the novel battery are extremely encouraging. After water enters the casing 50 and activates the battery 10, such activation has been found to take place within approximately three to five seconds. The battery 10 produces a voltage and current sufficient to light a light source 12 which is visible for up to three miles. The battery 10 performs satisfactorily without clogging or appreciable reduction of the specified performance.

The system is applicable to a single cell or a multiple array of cells, either in parallel or in series. The cell exhibits 1.55 V on load CCV at the Coast Guard required 200 ma. The single cell embodiment was tested with saltwater at 3.4% salinity to produce a power output for lighting a bulb with one candela output at 360° for eight hours. The novel battery was found to have a residual voltage of 1.48 V at the end of eight hours, i.e. it exhibits essentially negligible voltage drop over its required use.

The method according to the invention is practiced as follows: In its primary intended use, the battery 10 and its user both become immersed in water. The water may be either salt or fresh water. The user removes by hand the entry and exit port plugs 66 so that water surrounding the casing 50 is free to flow into the casing 50. The water activates the battery 10, functioning as a conductor by suspending cations and anions from cathode and anode plates 14 and 42, respectively, as a function of the pre-defined potential difference.

I claim:

1. A water-activated battery stored in a dry condition and activated at the time of use by the addition of a conductive aqueous solvent, comprising:

a cathode member, an anode member, conductive aqueous solvent in contact with said cathode member and said anode member, a battery casing enclosing said cathode member and said anode member and retaining said conductive aqueous solvent, spacer members spacing said cathode member from said anode member, said spacer members comprising a spacer clip including a block of clip material having a block face and having a plurality of clip legs extending substantially perpendicularly from said block face, said cathode member being retained between said clip legs, and said anode member being positioned adjacent to and spaced apart from said cathode member and abutting at least one of said clip legs.

2. The battery according to claim 1, wherein at least two of said plurality of clip legs tilt toward each other to firmly grip said cathode member.

3. The battery according to claim 1, wherein said block of clip material comprises four block corners and one of said clip leg extends from each of said block corners.

4. The battery according to claim 1, wherein said battery casing has a liquid entry port and a liquid exit port formed therein.

5. The battery according to claim 4, wherein said entry port is larger than said exit port.

6. The battery according to claim 4, which further comprises an entry port plug and an exit port plug, said entry and exit port plugs being removably fitted respectively into said entry and exit ports.

7. The battery according to claim 1, wherein said casing is formed of polypropylene.

8. A water-activated battery, stored in a dry condition and activated at the time of use by the addition of a conductive aqueous solvent, comprising:

a battery casing defining a chamber, said battery casing having a liquid entry port formed therein for allowing conductive liquid into said chamber;

a cathode member disposed in said chamber;

an anode member disposed in said chamber; and spacer members attached to said housing and rigidly spacing said cathode member from said anode member and from the bottom of the chamber.

9. A water-activated battery, stored in a dry condition and activated at the time of use by the addition of a conductive aqueous solvent, comprising:

a battery housing;

a cathode disposed in said housing, said cathode including a chloride member having a surface and a silver coating disposed on said surface;

an anode disposed in said housing spaced apart from said cathode, said anode including a magnesium member;

at least one spacer fixed in said battery housing separating said chloride member from said magnesium member and from the bottom of the housing; and a conductive aqueous solvent retained in said housing in contact with said chloride member and said magnesium member.

10. The battery according to claim 9, which further comprises lead wires electrically connected to said cathode and said anode respectively, said lead wires extending outside said housing.

11. The battery according to claim 9, wherein said spacer comprises a spacer clip including a block of clip material having a block face and having a plurality of clip legs extending substantially perpendicularly from said block face, wherein said anode member is retained between said clip legs, and wherein said cathode member is positioned adjacent to said anode member and abutting at least one of said clip legs.

12. A method of operating a water-activated battery, stored in a dry condition and activated at the time of use by the addition of a conductive aqueous solvent, comprising a cathode member, an anode member, spacers spacing said cathode member from said anode member and from the bottom of the housing, a battery housing enclosing the cathode member and the anode member, the battery housing being formed with a liquid entry port initially closed with a entry port plug and a liquid exit port initially closed With an exit port plug, the method which comprises:

immersing the initially dry battery in a conductive aqueous solvent, removing the entry port plug from the entry port to permit conductive aqueous solvent to enter the housing through the entry port, removing the exit port plug from the exit port to permit the conductive aqueous solvent to exit the housing through the exit port.

13. The battery according to claim 8, wherein said battery casing has a liquid entry port and a liquid exit port formed therein.

14. The battery according to claim 13, wherein said entry port is larger than said exit port.

15. The battery according to claim 9, wherein said battery housing has a liquid entry port and a liquid exit port formed therein, and wherein said entry port is larger than said exit port.

16. The battery according to claim 8, activated by addition of salt water.

17. The battery according to claim 9, activated by addition of salt water.

18. The method of claim 12, in which the battery is activated by addition of salt water.

19. The battery of claim 8, having a single cell.

20. The battery of claim 8, able to produce a voltage and current sufficient to light a light source which is visible for up to three miles.

21. The battery of claim 8, in which activation takes place within five seconds after water enters the casing.

22. The battery of claim 19, able to produce a power output for lighting a bulb with one candela output for eight hours.

* * * * *

UNITED STATES PATENT AND TRADEMARK OFFICE
CERTIFICATE OF CORRECTION

PATENT NO. : 5,665,487
DATED : September 9, 1997
INVENTOR(S) : Shiraz Dhanji

It is certified that error appears in the above-identified patent and that said Letters Patent is hereby corrected as shown below:

On the title page, item [54] and column 1, line 1, should read

-- WATER-ACTIVATED STORAGE BATTERY--

Signed and Sealed this

Third Day of March, 1998

Attest:

*Attesting Officer*

BRUCE LEHMAN

*Commissioner of Patents and Trademarks*